C. REDD.
FILLING MACHINE.
APPLICATION FILED NOV. 29, 1915.

1,218,315.

Patented Mar. 6, 1917.
6 SHEETS—SHEET 2.

Witnesses:

Inventor:
Charlie Redd,
By Dyrenforth, Lee, Chritton & Wiles, Attys.

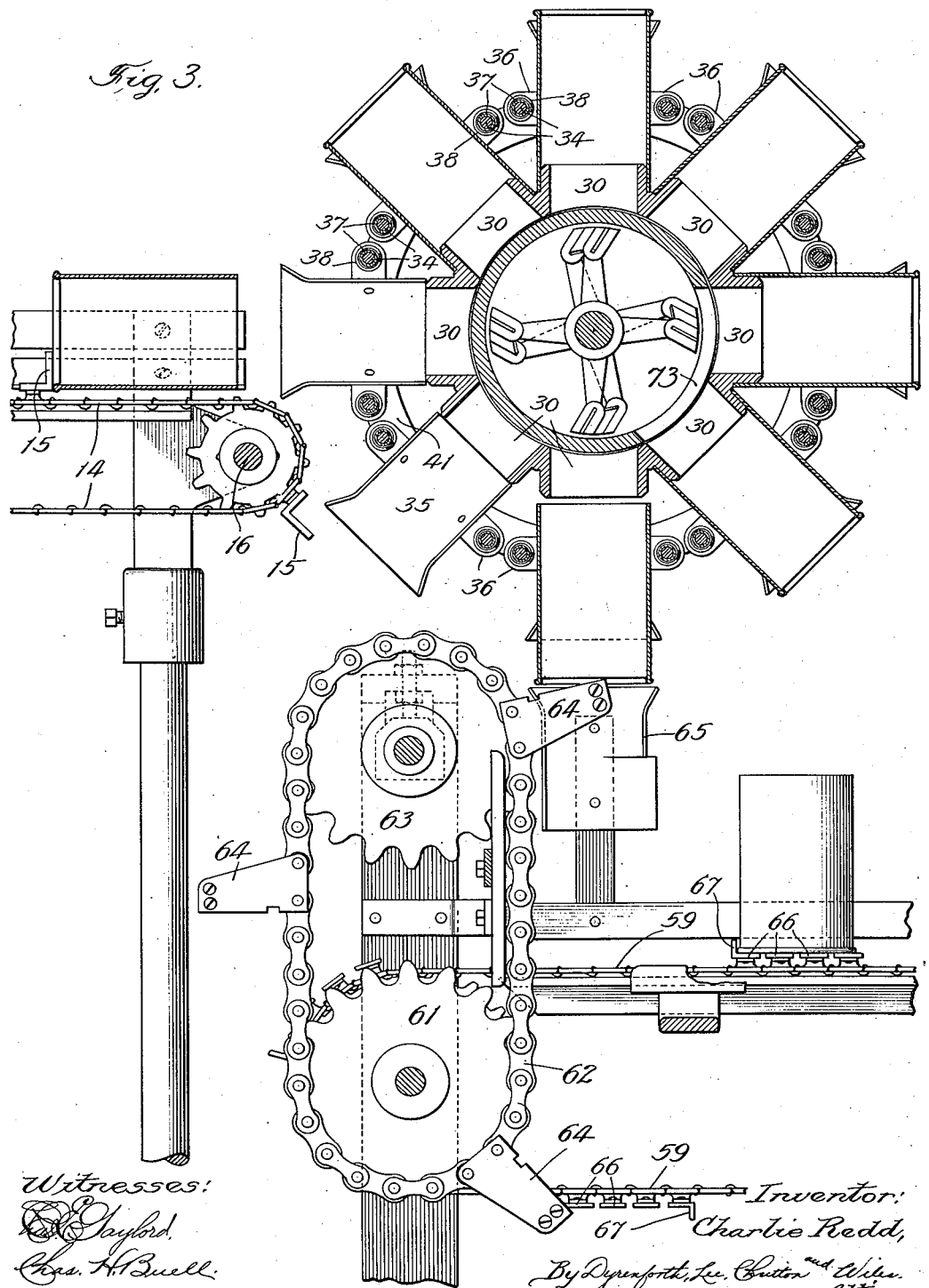

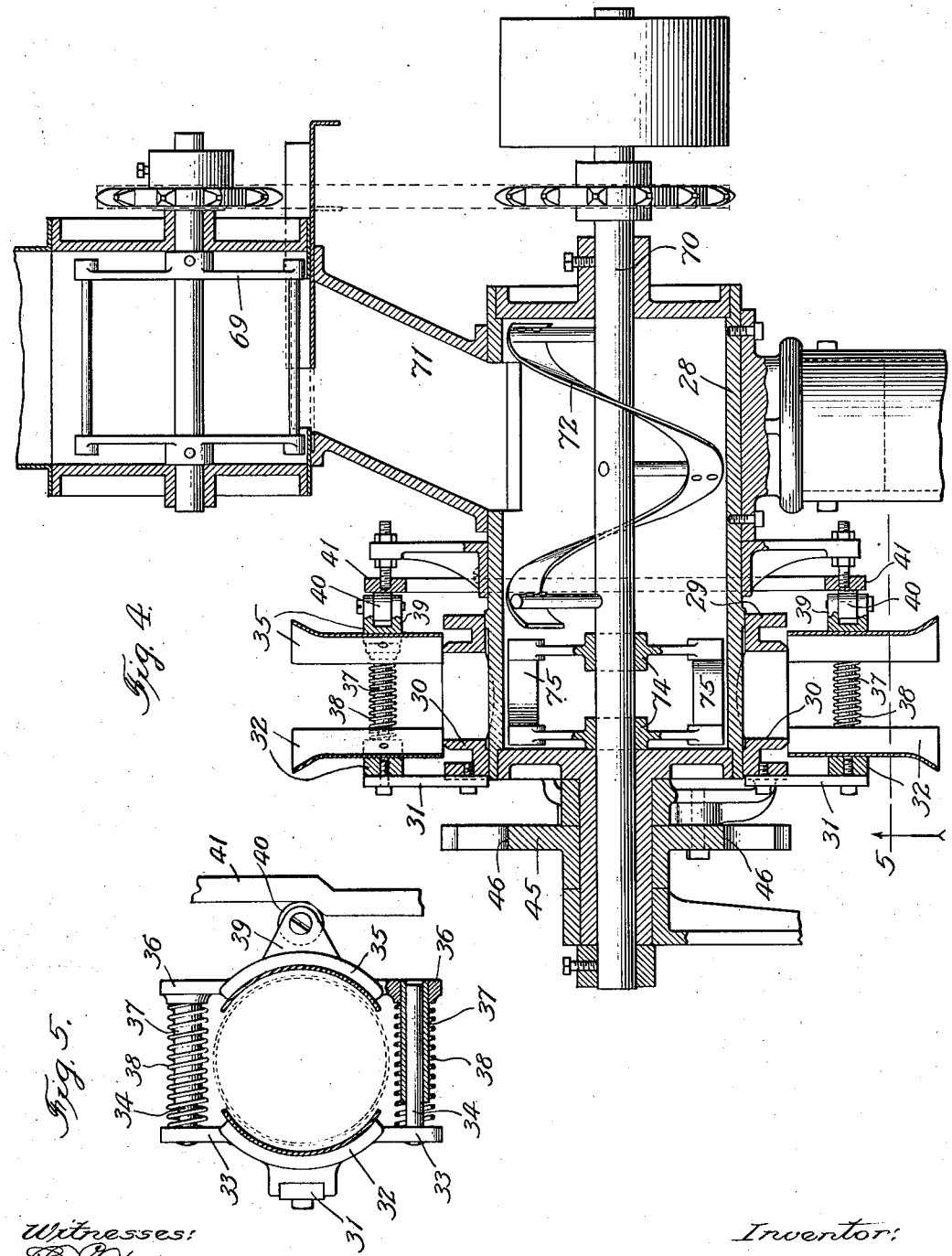

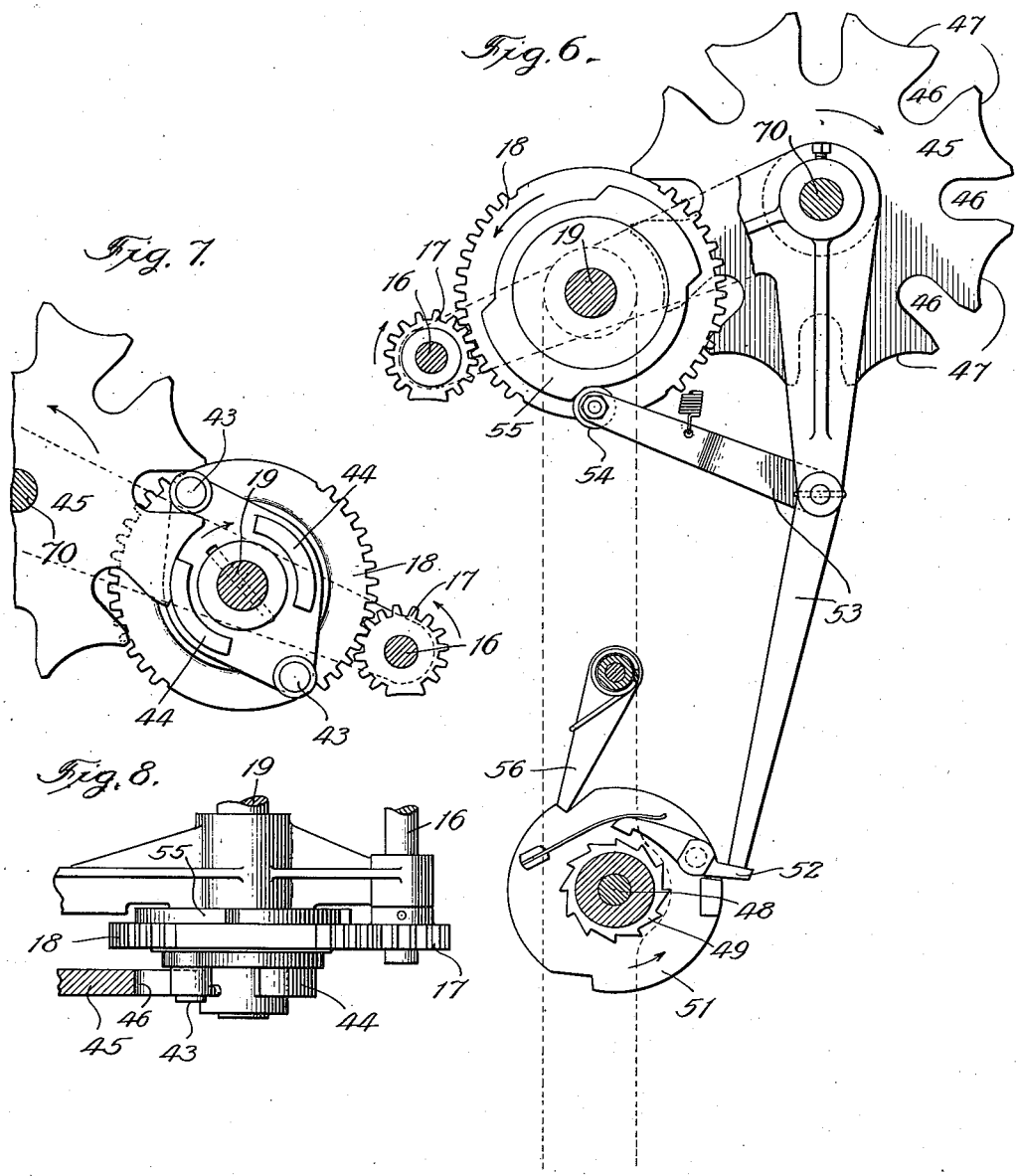

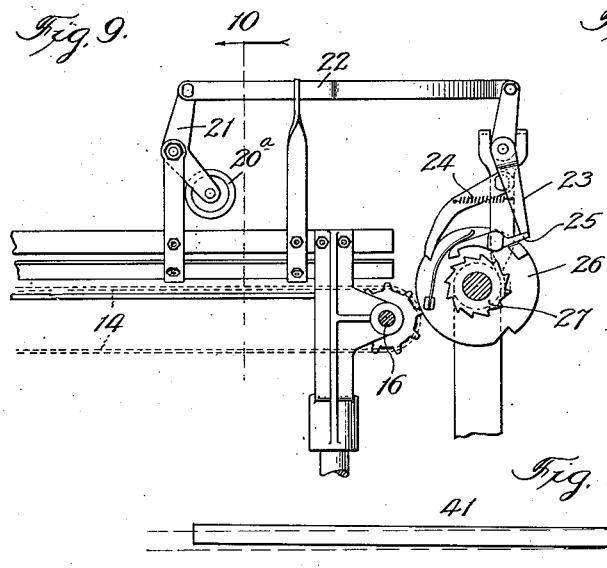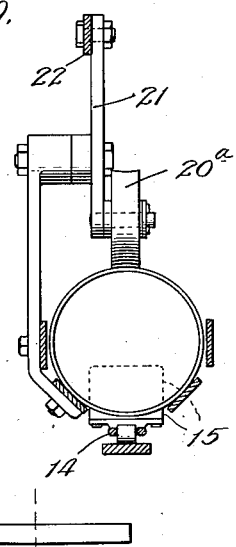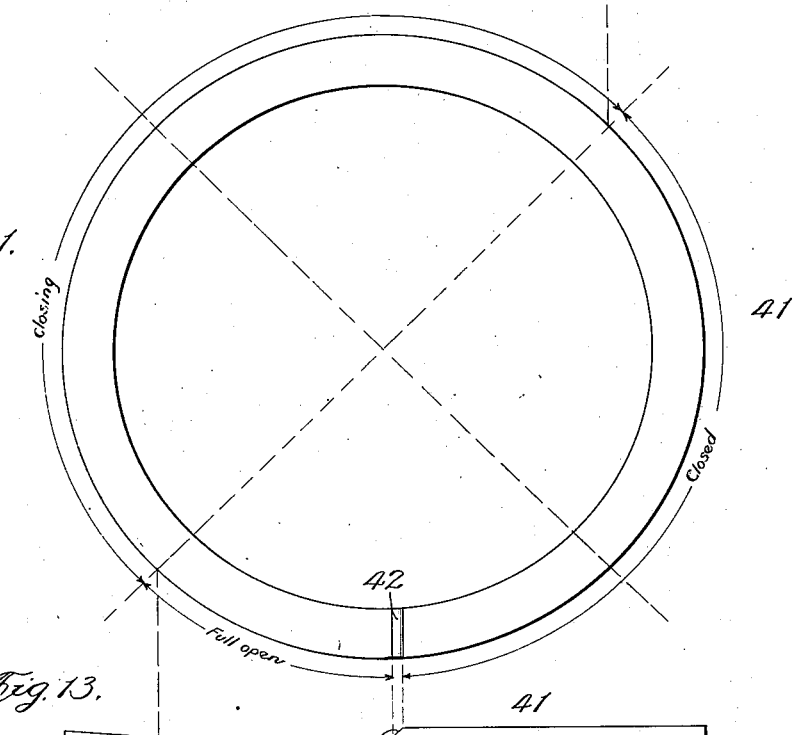

UNITED STATES PATENT OFFICE.

CHARLIE REDD, OF CHICAGO, ILLINOIS, ASSIGNOR TO ISAAC PIESER AND CHARLES G. LIVINGSTON, BOTH OF CHICAGO, ILLINOIS.

FILLING-MACHINE.

1,218,315.

Specification of Letters Patent.

Patented Mar. 6, 1917.

Application filed November 29, 1915. Serial No. 64,123.

*To all whom it may concern:*

Be it known that I, CHARLIE REDD, a citizen of the United States, residing at Chicago, in the county of Cook and State of Illinois, have invented a new and useful Improvement in Filling-Machines, of which the following is a specification.

My invention relates to certain new and useful improvements in filling machines and is fully described and explained in the specification and shown in the accompanying drawings, in which:—

Figure 1:
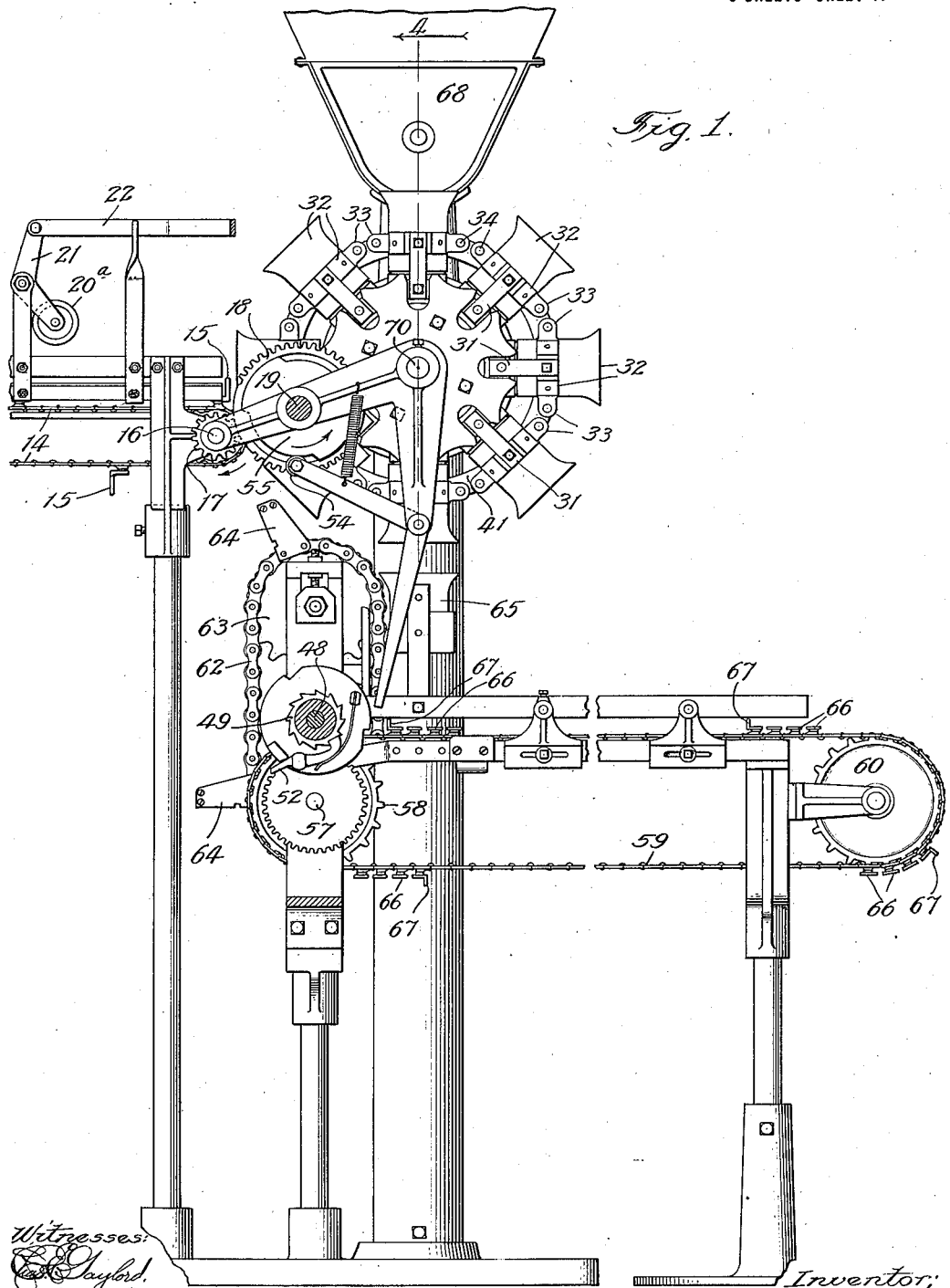
Figure 2:
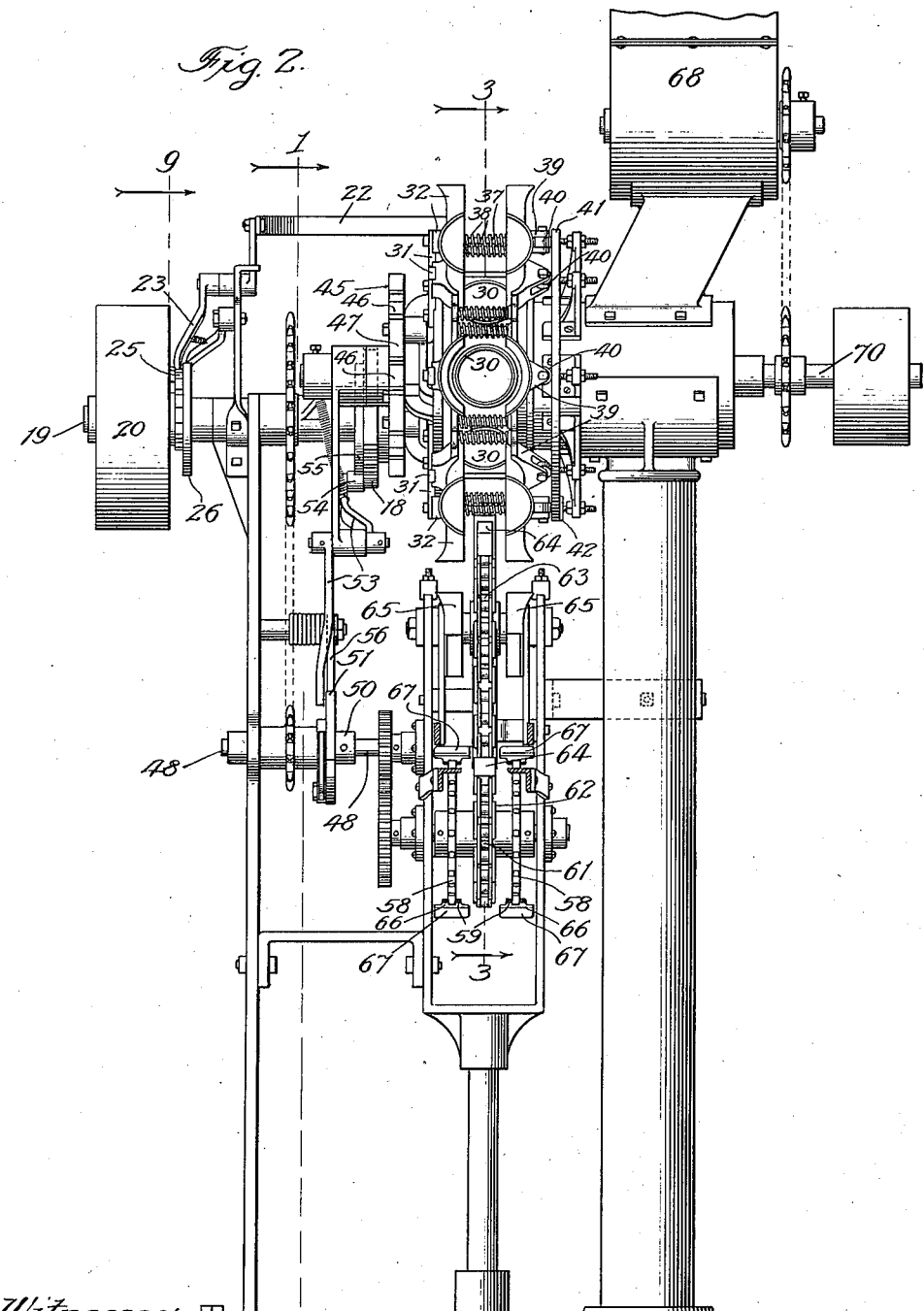

Figure 1 is a sectional side elevation of my improved device taken on line 1—1, of Fig. 2; Fig. 2 is a front elevation; Fig. 3 is a longitudinal section on the line 3 of Fig. 2; Fig. 4 is a transverse section on the line 4 of Fig. 1; Fig. 5 is a section through one of the package holders on the line 5 of Fig. 4; Fig. 6 is a detailed view showing the driving mechanism; Fig. 7 is a view of a portion of the driving mechanism from the opposite side; Fig. 8 is a front plan of the parts shown in Fig. 7; Fig. 9 is a section on the line 9 of Fig. 2, showing the clutch mechanism which controls the operation of the entire machine; Fig. 10 is a section on the line 10 of Fig. 9; Fig. 11 is a face view of the cam which operates the package holders; Fig. 12 is a top plan of the same, and Fig. 13 is a bottom plan of the same.

In view of the multiplicity of parts in the present machine I will first, by way of introduction, describe the general principle of operation to the end that when the various sets of separate mechanism are described in detail, their intended operation will be generally understood. The present device is designed for filling cylindrical packages or cans with pulverulent material. Viewing the machine as shown in Fig. 1 the empty packages come in on a conveyer chain lying down with their open ends toward the filling machine. As they come in in series they operate clutch mechanism which, if no cans are being supplied, keeps the entire machine from operating.

The filling machine itself has a number of holders extending radially on a rotatable support. The rotatable structure with its holders moves with a step-by-step motion being driven by a Geneva gear. The holders are capable of being opened and closed and when closed they tightly grip the several packages. The holders one by one stop in front of the feed chain and the packages are thrust into them. The next step of rotation then occurs, the packages moving in a clockwise direction considering the machine as viewed in Fig. 1. The holders are presently closed upon the packages to grip them firmly and during the third quadrant of their rotation about their axis, the packages are filled with material which enters them from a material receptacle in the axis of rotation of the revolving structure. After the packages are thus filled they finally come to rest in a vertical position at the lowermost position and at that time they are released from the holders so as to fall by gravity. They are not permitted, however, to fall free, but on the contrary in their vertical movement, they rest on downwardly-moving fingers which deposit them gently on bases provided for the purpose on a feed-out chain which is shown at about the center of Fig. 1. This chain moves with a step-by-step movement so that the packages are ultimately led away.

The machine thus consists broadly of a series of mechanisms which, to a large extent, can be considered successively as if disconnected from each other. In the detailed description of the machine I will first explain the feed-in mechanism and clutch mechanism controlled thereby; then the structure of the holders, their mounting and the method by which they are opened and closed; then the mechanism by which they are rotated; then the lowering fingers which control the descent of the packages from the holders to the feed-out chain, and the structure and operation of the feed-out chain, and finally the material feeding means.

The feed-in chain and its driving mechanism is illustrated in Figs. 1, 6 and 7, and the clutch controlled thereby in Figs. 9 and 10, to which reference will now be made. 14 is the feed-in chain provided with pushers 15. It runs over a sprocket on a shaft 16 driven intermittently by a mutilated pinion 17 which is in mesh with a mutilated gear 18. The gear 18 runs continuously as long as packages are being sent through the machine, and thus as long as the packages are supplied in the proper order the feed chain continues to advance the packages step by step. The gear 18 is on a main shaft 19 run by a pulley 20, engagement between the two being produced by the clutch mechanism shown in Figs. 9 and 10.

In this clutch mechanism 20ª is a roller adapted to contact with the package on the feed-in chain. This roller is carried by a lever 21 connected by a link 22 to a stop lever 23 which, under the influence of a spring 24, is drawn into position to engage a pawl 25 on a disk 26 on the shaft 19 to hold the same out of engagement with a ratchet 27. When a package is in place it lifts the roller 20ª and throws the stop lever into idle position, so that the ratchet is in engagement and the shaft 19 is continuously driven. When no package is in position, the stop lever is drawn into position to engage the pawl and release the ratchet so as to free the shaft from the driving influence of the pulley. In this way the entire feeding action of the machine is dependent upon the proper feed of packages. Under normal conditions it will be understood that the packages are fed in proper sequence and that the clutch mechanism thus described is idle, the shaft 19 rotating continuously, and in the description of the parts hereinafter enumerated this occasional stoppage of the shaft 19 will be ignored.

Referring now to the holder construction and its method of mounting for the required rotation, attention is particularly called to Figs. 1, 3, 4, 5 and 11 to 13, inclusive. The machine is provided with a central hollow drum 28, which as will be hereinafter described, serves as a conduit through which the material fed into the packages passes. Rotatably mounted upon this drum is an annular member 29 provided with a series of radially projecting bosses 30 through any of which material may pass. The annular member 29 has a series of outwardly projecting spokes 31 which carry the immovable sides 32 of the package holder. Each of these immovable sides has a central segment conforming to the curvature of the package to be handled and projecting ears 33 which carry transverse pins 34. Opposed to the immovable parts of the package holders are corresponding movable parts 35, each having a central segment and laterally projecting ears 36 which carry tubes 37 telescoped over the pins 34, the parts being normally pressed apart by springs 38. The holders are of such shape and size that a package when in place will slip in and around the corresponding boss 30, as is illustrated in the case of certain of the holders in Fig. 3.

Each of the movable holder sides has a projecting ear 39 carrying a roller 40 which engages the cam 41 stationarily mounted in the machine. The structure of this cam is best illustrated in Figs. 11 to 13. The holder parts being normally held apart by the spring, they are closed only so far as forced together by the cam. Starting at a point 45° from the bottom and in their upward movement, the cam begins gradually to slope outward or toward the holders, so that the holders close gradually for 180°. When they have risen 45° they receive the packages and at that time are practically wide open. The holders are tight upon the cartons, however, when the cartons begin to move down, that is, from a point 45° beyond the uppermost position to the extreme bottom of their movements. When the extreme bottom is reached, and the cartons are to be released after having been filled, there is a sharp step 42 in the cam which permits the springs 38 to open the holders and release the cartons. The cartons at that time rest upon the fingers which control this downward movement as will be hereinafter described.

The mechanism for driving the carton holders is best shown in Figs. 1, 6, 7 and 8, and consists essentially of a Geneva gearing. The shaft 19 heretofore mentioned has upon it two pins 43, these being the usual driving pins of a Geneva gearing and two cam-stops 44. The rotary annular member which carries the carton holders has fastened to it the other member of the Geneva gearing 45 provided with the usual radial slots 46 and segmental peripheral parts 47 to engage the stops 44. The arrangement is such that for each revolution of the shaft 19, the member 45 advances two steps. The slots in this member correspond in position to the holders so that for each half revolution of the shaft 19 one holder moves from one given position to the next in series, while the next following holder moves up and takes its place. In this way the desired step-by-step motion is accomplished.

While considering the general driving mechanism it will be convenient also to explain the mechanism for driving the feed-out chain, and of the fingers which control the descent of the packages. 48 is a shaft which is continuously rotated, being driven from the shaft 19 and at a higher speed, as shown in Fig. 2. On the shaft 48 is a ratchet 49. 50 is an intermittently driven sleeve on which is a disk 51 carrying a pivoted pawl 52 adapted to engage with the ratchet 49. Obviously, when the pawl is in engagement with the ratchet the sleeve 50 will be driven and when free from engagement with the ratchet the sleeve will stand still. The outer end of the pawl is in position to be engaged by a bell-crank-lever 53, the opposite end of which is provided with a roller 54 running on a cam 55 on the shaft 19. The cam has two projections so that once for each half revolution of the shaft 19, that is, once for each step in the movement of the carton holders, the stop lever is thrown off the pawl, the pawl engages the ratchet, and the shaft can make a single revolution. In the meantime the stop lever will have passed over a projection on the cam and will stop the disk 51 after one revolution. A pawl 56 serves to prevent any back-lash which might otherwise occur.

The shaft 48 is gear connected to a shaft 57 upon which are two sprockets 58 over which run the feed-out chains 59. These chains run at their opposite ends over idle sprockets 60. Midway between the two sprockets 58 on which the feed-out chains run is a sprocket 61 over which runs a chain 62, this chain also passing over an idle sprocket 63 vertically above the sprocket 61. The chain 62 carries the lowering fingers designated by 64, and since the feed-out mechanism consists of two chains spaced apart and the chain 62 lies between these chains, these fingers can pass down between the feed-out chains and around in their course without interfering therewith.

The operating of this portion of the mechanism will now be apparent. Just at the moment when the carton carriers, or holders, come to rest, thereby bringing one carton into the lowermost position and releasing it, the feed-out chains commence to move. This timing will be readily perceived from Figs. 6 and 7, where it will be observed the pin 43 is just swinging out of engagement with the Geneva gear and the carton holders are just coming to rest, while at the same time the cam 55 is just about to move the bell-crank-lever to release the pawl 52 and permit the feed-out mechanism and the lowering-finger mechanism to operate. And just at this time the fingers are in the position shown in Fig. 3, so that just as the carton holders open the fingers are in position to receive the cartons. Immediately, however, the feed-out chains begin to move forward and the fingers to fall. The last preceding carton is thus carried away and the carton supported by the fingers moves down vertically passing through a guiding tube 65 slotted for the passage of the fingers and coming to rest on the feed-out chains. These chains are provided with rests 66 at intervals, each having an upturned lip 67 at its rear end to prevent the inertia of the carton causing it to fall off when the feed-out chains start in motion.

The foregoing concludes the description of the cycle of operation or movements through which the cartons pass, and of the respective mechanisms which operate upon them in their movement. It remains, however, to describe the filling mechanism for which purpose reference will be had to Figs. 3 and 4. The material to be fed into the cartons enters at the upper part of the machine from a hopper 68 (Fig. 1), in the lower part of which is an agitator 69 which is constantly driven through the medium of a sprocket chain connecting it with a shaft 70 which is also constantly driven from a source independent of the driving mechanism. The material which passes the agitator 69 passes through a chute 71 and enters the hollow drum forming the center of the machine. Through this drum the shaft 70 passes, and this shaft carries a spiral feeder 72 which moves the material along toward the end of the drum and to the space within and surrounded by the circle of holders. The drum at this point has a quadrant-shaped part cut away, as shown at 73 in Fig. 3, and within this end section of the drum is an agitator consisting of two spiders 74 with slightly inclined blades 75 which stir up the material and force it into the bosses over which the cartons are at that time slipped. The feed of material into the cartons is cut off by the rotation of the carton-carrying means on the drum, so that the bosses pass beyond the opening in the drum wall, and immediately after passing the space in the drum wall the cartons are released and lowered as hereinbefore described.

I realize that considerable variation is possible in the details of the construction herein shown, and I do not intend to limit myself thereto, except as pointed out in the following claims in which it is my intention to claim all the novelty inherent in the device as broadly as is permitted by the state of the art.

I claim as new and desire to secure by Letters Patent:

1. In combination, package-conveying means moving in a closed curvilinear path in a vertical plane comprising package holders radial of the conveying means, means to feed empty packages into the holders with their open ends inward, means central of the path of the packages for filling the same, means to release the packages when in a vertical position, feed-out means below the conveying means, and means to lower the packages to and deposit them on the feed-out means when released.

2. In combination, package-conveying means moving in a closed curvilinear path in a vertical plane comprising holders radial of the conveying means, a horizontal feed-in device to hold packages with their open ends toward the conveying means and arranged to feed the packages into the holders while in a horizontal position, means central of the path of the packages for filling the same, means to release the packages when in a vertical position, feed-out means below the conveying means, and means to lower the packages to and deposit them on the feed-out means when released.

3. In combination, package-conveying means moving step by step in a closed curvilinear path in a vertical plane comprising holders radial of the conveying means, a horizontal feed-in device to hold packages with their open ends toward the conveyer, means to operate the feed-in device step by step while the conveying means is stationary to feed the packages into the holders, feed-out means below the conveying means, means to lower the packages to and deposit them on the feed-out means when released, and means to operate the feed-out and lowering means step by step while the conveying means is at rest.

4. In combination, package-conveying means moving in a closed curvilinear path in a vertical plane comprising package holders radial thereof, means to feed empty packages into the holders with their open ends inward, a constantly driven shaft, a Geneva gearing between the shaft and the conveying means to drive the conveying means step by step, a mutilated gear connecting the shaft with the feed-in means to drive the same step by step while the conveying means is stationary, means central of the path of the packages for filling the same, means to release the packages when in a vertical position, feed-out means below the conveying means, and means to lower the packages to and deposit them on the feed-out means when released.

5. In combination, package-conveying means moving in a closed curvilinear path in a vertical plane comprising package holders radial thereof, means to feed empty packages into the holders with their open ends inward, a constantly driven shaft, a Geneva gearing between the shaft and the conveying means to drive the conveying means step by step, a mutilated gear connecting the shaft with the feed-in means to drive the same step by step while the conveying means is stationary, means central of the path of the packages for filling the same, means to release the packages when in a vertical position, feed-out means below the conveying means, means to lower the packages to and deposit them on the feed-out means when released, a one-revolution clutch-device controlling the feed-out and package-lowering means, and a cam timed with a Geneva gearing to operate the clutch device to drive the feed-out and package-lowering means step by step when the conveying means is stationary.

6. In combination, package-conveying means moving a closed curvilinear path in a vertical plane comprising package holders connected therewith, package-filling means operating upon the passage of the holders to discharge material thereinto, feed-in means for feeding packages to the holders, a roller engaging packages on the feed-in means and held in normal position thereby, a clutch device controlling the operation of the machine and held in operation while the roller is held in normal position and thrown out by its movement to abnormal position to stop the machine in the absence of empty packages on the feed-in device.

7. In a package-filling machine, a central filling device, a conveying device guided to move in a curvilinear path in a vertical plane around the filling means comprising bosses on the conveying means to enter the top of a package and holders in line with said bosses and adapted to clamp the packages in position over said bosses, and means to release the holders.

8. In a package-filling machine, a central filling device, a conveying device guided to move in a curvilinear path in a vertical plane around the filling means comprising bosses on the conveying means to enter the top of a package and holders in line with said bosses and adapted to clamp the packages in position over said bosses, and means to release the holders when in a vertical position.

9. In a package-filling machine, conveying and filling means, means to release the packages when filled while in a vertical position, feed-out means below the packages when released, a package-lowering device comprising a chain running over sprockets in vertical line with each other and fingers to receive the packages and lower them onto the feed-out device.

10. In a package filling machine, conveying and filling means, means to release the packages when filled, a feed out device and package lowering means comprising an endless vertical flexible member having projecting fingers to control the descent of packages, an endless horizontal member on which the packages come to rest and intersecting the path of the lowering device, package rests on the horizontal device, the horizontal and vertical devices being simultaneously moved and timed so that the vertically movable device deposits the package on the package-receiving means on the horizontal device when the same is in line with said projecting fingers as they descend.

11. In a package filling machine, conveying and filling means, means to release the packages when filled, a feed out device and package lowering means comprising three shafts, two on a vertical line with each other and the third on the horizontal line of the lowermost of the first two, an endless vertical chain running over sprockets on the first two shafts, endless horizontal chains on the two sides of the vertical chain and running over sprockets on the lowermost of the first two and third shafts, package rests on the horizontal chains and lowering fingers on the vertical chain, positioned so that the descent of the lowering fingers deposits the packages on the package rests.

In testimony whereof I have hereunto set my hand this 26th day of November, 1915.

CHARLIE REDD.

In presence of two subscribing witnesses:
L. HEISLAR,
A. J. SCHWARTZ.